(12) United States Patent
Gao et al.

(10) Patent No.: US 11,402,656 B2
(45) Date of Patent: Aug. 2, 2022

(54) DISPLAY SWITCHING DEVICE, DISPLAY DEVICE AND ELECTRONIC DEVICE

(71) Applicant: BOE TECHNOLOGY GROUP CO., LTD., Beijing (CN)

(72) Inventors: Jian Gao, Beijing (CN); Xue Dong, Beijing (CN); Xiaochuan Chen, Beijing (CN); Yafeng Yang, Beijing (CN); Pengcheng Lu, Beijing (CN); Wei Wang, Beijing (CN); Xinli Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1066 days.

(21) Appl. No.: 16/067,691

(22) PCT Filed: Oct. 24, 2017

(86) PCT No.: PCT/CN2017/107488
§ 371 (c)(1),
(2) Date: Jul. 2, 2018

(87) PCT Pub. No.: WO2018/166207
PCT Pub. Date: Sep. 20, 2018

(65) Prior Publication Data
US 2021/0165241 A1    Jun. 3, 2021

(30) Foreign Application Priority Data

Mar. 17, 2017  (CN) .......................... 201710160630.9

(51) Int. Cl.
*G02B 30/28*    (2020.01)
*G02F 1/1335*   (2006.01)
*G02F 1/1343*   (2006.01)

(52) U.S. Cl.
CPC ....... *G02B 30/28* (2020.01); *G02F 1/133504* (2013.01); *G02F 1/134309* (2013.01)

(58) Field of Classification Search
CPC .............. G02B 30/28; G02F 1/133504; G02F 1/134309
See application file for complete search history.

(56) References Cited

U.S. PATENT DOCUMENTS 5,561,558 A     10/1996  Shiono et al.
2012/0268816 A1  10/2012  Bae et al.
(Continued)

FOREIGN PATENT DOCUMENTS

CN    1116719 A      2/1996
CN    103348269 A   10/2013
(Continued)

OTHER PUBLICATIONS

Second Chinese Office Action dated Feb. 2, 2019.
First Chinese Office Action issued by the Chinese Patent Office dated Sep. 25, 2018.

*Primary Examiner* — Nathanael R Briggs
(74) *Attorney, Agent, or Firm* — Dilworth & Barrese, LLP.; Michael J. Musella, Esq.

(57) ABSTRACT

A display switching device, a display device and an electronic device are provided. The display switching device includes: a controller; and a lens array, including a plurality of diffractive lenticular lenses, wherein each of the diffractive lenticular lenses includes: a first substrate, including a diffraction phase grating array; a liquid crystal element, including liquid crystal being filled in the diffraction phase grating array; a first electrode layer and a second electrode layer configured to apply a voltage to the liquid crystal element, wherein the controller is configured to acquire a corresponding display mode and apply a control voltage corresponding to the display mode to the first electrode layer (Continued)

and the second electrode layer according to the display mode to change a refractive index state of the liquid crystal element.

10 Claims, 4 Drawing Sheets

(56) References Cited

U.S. PATENT DOCUMENTS

| | | | | |
|---|---|---|---|---|
| 2015/0168756 A1* | 6/2015 | Cho | ............ | G02F 1/1343 |
| | | | | 349/33 |
| 2016/0011564 A1* | 1/2016 | Tanabe | ............ | G02F 1/13471 |
| | | | | 359/11 |
| 2018/0231867 A1 | 8/2018 | Gao et al. | | |

FOREIGN PATENT DOCUMENTS

| | | |
|---|---|---|
| CN | 203688918 U | 7/2014 |
| CN | 106226930 A | 12/2016 |
| CN | 106324898 A | 1/2017 |
| JP | H09318942 A | 12/1997 |

* cited by examiner

DISPLAY SWITCHING DEVICE, DISPLAY DEVICE AND ELECTRONIC DEVICE

TECHNICAL FIELD

The present disclosure relates to a display switching device, a display device and an electronic device.

BACKGROUND

At present, among three-dimensional (3D) stereoscopic display technologies, the naked eye 3D displaying is favored in the three-dimensional stereoscopic display field because it does not require the viewer to wear glasses.

At present stage, the main naked eye 3D technology can be divided into directional backlight type, parallax barrier type and lens array type. Among them, the directional backlight type requires time-division multiplexing of the light source, and this technology is complicated and the 3D effect is poor. For the parallax barrier type, the transmittance is lower than 50%, and the cost is high, the volume is large, the weight is large and the commercialization is promoted poorly. The lenticular lens array type has improved transmittance compared to the parallax barrier type, and it is the most widely used type in the naked eye 3D, but it has a greater influence on the normal display of a 2D image, introducing a certain amount of optical aberration to the image, and the image display effect of 2D and 3D switching is not ideal.

SUMMARY

Embodiments of the present disclosure provide a display switching device, a display device and an electronic device. The display switching device has a simple structure, which facilitates to be combined with a display component, and achieves 2D and 3D switchable display effects.

According to a first aspect of the present disclosure, a display switching device is provided, the display switching device comprises: a controller; and a lens array, comprising a plurality of diffractive lenticular lenses, and each of the plurality of diffractive lenticular lenses comprising: a first substrate, wherein the first substrate comprises a diffraction phase grating array; a liquid crystal element, comprising liquid crystal that are filled in the diffraction phase grating array; a first electrode layer and a second electrode layer, configured to apply a voltage to the liquid crystal element, wherein the controller is configured to acquire a corresponding display mode and apply a control voltage corresponding to the display mode to the first electrode layer and the second electrode layer according to the display mode to change a refractive index state of the liquid crystal element.

For example, the first electrode layer is located on the diffraction phase grating array, an insulating layer is arranged between the first electrode layer and the second electrode layer, and the second electrode layer is located on the insulating layer.

For example, the diffraction phase grating array comprises a plurality of first phase grating groups and second phase grating groups that are periodically arranged, and the first phase grating groups and the second phase grating groups are symmetrically arranged about a center line of the diffractive lenticular lens.

For example, each of the first phase grating groups and second phase grating groups comprises first grating element to M-th grating element.

For example, each grating element comprises N steps, wherein N is $2^m$, m is a positive integer, a phase difference between adjacent steps is $2\pi/N$, and a height of the step is $$h = \frac{\frac{\lambda}{N}}{n - n_o},$$

wherein $\lambda$ is a wavelength of incident light, n is a refractive index of the first substrate, $n_o$ is a minimum refractive index of the liquid crystal element with respect to the incident light.

For example, a j-th grating element comprises a first side and a second side, wherein a distance between the first side and the center line of the diffractive lenticular lens is $r_{j,1}$, and a distance between the second side and the center line of the diffractive lenticular lens is $r_{j,2}$, wherein j is a positive integer less than or equal to M.

For example, wherein $$r_{j,1} = \left[\left(f + \frac{(2j-1)\frac{\lambda}{2}}{n_1}\right)^2 - f^2\right]^{1/2} = \sqrt{\frac{(2j-1)f\lambda}{n_1}}\left(1 + \frac{(2j-1)\lambda}{4n_1 f}\right)^{1/2}$$

$$r_{j,2} = \left[\left(f + \frac{j\lambda}{n_1}\right)^2 - f^2\right]^{1/2} = \sqrt{\frac{2jf\lambda}{n_1}}\left(1 + \frac{j\lambda}{2n_1 f}\right)^{1/2}$$

wherein f is an object focal length of the lens, and $n_1$ is an object medium where the first substrate is located.

For example, a first side of each of the grating elements comprises N steps.

For example, widths of consecutive N-1 steps in each grating element are same, and widths of remaining steps are different from the widths of the N-1 steps, wherein the widths of the consecutive N-1 steps in the j-th grating element is $$t_{j,2} = \frac{d_{j,2}}{\frac{N}{2}},$$

and the widths of the remaining steps in the j-th grating element is $$t_{j,1} = d_{j,1} - \sum_{i=1}^{m-1} \frac{d_{j,2}}{2^i},$$

wherein $d_{j,1} = r_{j,1} - r_{j-1,2}$, $d_{j,2} = r_{j,2} - r_{j,1}$.

For example, the first electrode layer comprises a plurality of electrode strips.

For example, each of the first electrode layer and the second electrode layer comprises a transparent electrode.

For example, under a condition that the first electrode layer and the second electrode layer are not applied with a voltage, the lens array is the diffractive lenticular lens array to enter a 3D display mode; and under a condition that the first electrode layer and the second electrode layer are applied with a voltage, the lens array is a glass to enter a 2D display mode.

According to a second aspect of the present disclosure, a display device is provided, the display device comprises a display component and a display switching device that is on a light emitting side of the display component, and the display switching device is according to the first aspect of the present disclosure.

According to a third aspect of the present disclosure, an electronic device is provided, the electronic device comprises the display device according to the second aspect of the present disclosure.

BRIEF DESCRIPTION OF THE DRAWINGS

The above and/or additional aspects of the embodiments of the present disclosure will become apparent and easily understood from the description of the embodiments in combination with the following drawings, wherein.

REFERENCE NUMERALS

Figure 1:
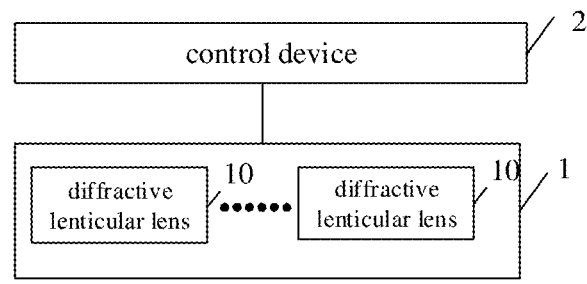
FIG. 1 is a structural schematic diagram of a display switching device according to an embodiment of the present disclosure.

1—lens array; 2—controller; 10—diffractive lenticular lens; 11—first substrate; 12—liquid crystal element; 13—first electrode layer; 14—insulating layer; 15—second electrode layer; 16—second substrate; 111—diffraction phase grating array; 111a—first phase grating group; 111b—second phase grating group; 100—display component; 200—display switching device.

DETAILED DESCRIPTION

The embodiments of the present disclosure are described in detail below, and examples of the embodiments are illustrated in the drawings, wherein the same or similar reference numerals represent the same or similar elements or elements having the same or similar functions. The embodiments described below with reference to the accompanying drawings are exemplary, are only used to explain the embodiments of the present disclosure, and should not be construed as limit to the embodiments of the present disclosure.

A display switching device, a display device and an electronic device according to embodiments of the present disclosure are described below with reference to the drawings.

FIG. 1 is a structural schematic diagram of a display switching device according to an embodiment of the present disclosure.

Figure 2:
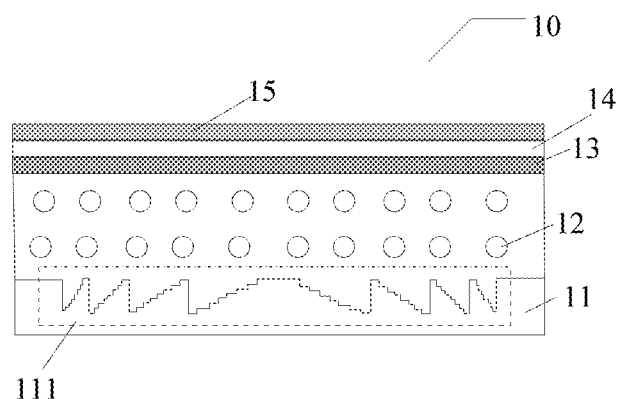
FIG. 2 is a structural schematic diagram of a diffractive lenticular lens according to an embodiment of the present disclosure.

As illustrated in FIG. 1, the display switching device according to the embodiment of the present disclosure comprises a lens array 1 and a controller 2. The lens array 1 comprises a plurality of diffractive lenticular lenses 10, wherein each of the diffractive lenticular lenses 10 comprises a same structure. FIG. 2 is a structural schematic diagram of a diffractive lenticular lens 10 according to an embodiment of the present disclosure.

Each of the diffractive lenticular lenses 10 may comprise a first substrate 11, wherein the first substrate 11 comprises a diffraction phase grating array 111; a liquid crystal element 12, comprising liquid crystal that are filled in the diffraction phase grating array 111; a first electrode layer and a second electrode layer that are configured to apply a voltage to the liquid crystal element, wherein the controller is configured to acquire a corresponding display mode and apply a control voltage corresponding to the display mode to the first electrode layer and the second electrode layer according to the display mode to change a refractive index state of the liquid crystal element.

Here, the liquid crystal in the liquid crystal element are at least filled between the diffraction phase grating array, and may also be on and between the diffraction phase grating array.

For example, the first electrode layer 13 may be located above the diffraction phase grating array, an insulating layer 14 may be arranged between the first electrode layer 13 and the second electrode layer 15, and the second electrode layer 15 may be located on the insulating layer 14. FIG. 2 illustrates an exemplary structure of such a diffractive lenticular lens 10.

For example, arrangement positions of the first electrode layer and the second electrode layer may not be as illustrated in FIG. 2, and embodiments of the present disclosure are not limited thereto as long as the first electrode layer and the second electrode layer are configured to be capable of applying a voltage to the liquid crystal element to deflect the liquid crystal in the liquid crystal element. For example, the first electrode layer 13 may be arranged on a side of the first substrate 11 opposite to the liquid crystal element, and the second electrode layer 15 may be arranged on a side of the liquid crystal element 12 opposite to the first substrate 11.

Here, it should be noted that the application of the control voltage corresponding to the display mode to the first electrode layer and the second electrode layer comprises a situation that no voltage is applied to the first electrode layer and the second electrode layer, for example, a voltage of zero is applied to the first electrode layer and the second electrode layer, or a same voltage is applied to the first electrode layer and the second electrode layer and there is no potential difference between the two electrode layers.

Wherein the controller 2 is used to acquire a corresponding display mode, and apply the control voltage corresponding to the display mode to the first electrode layer 13 and the second electrode layer 15 according to the display mode to change the refractive index state of the liquid crystal element 12.

Figure 3:
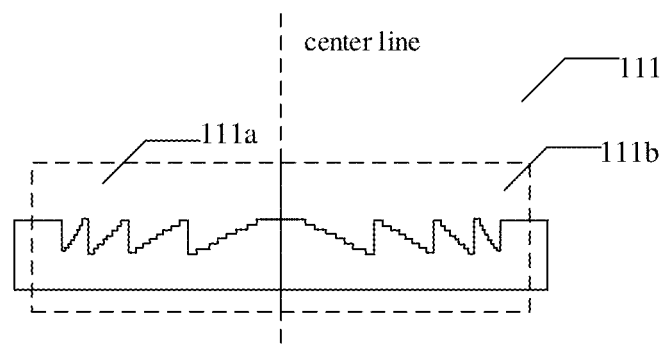
FIG. 3 is a structural schematic diagram of a diffraction phase grating array according to an embodiment of the present disclosure.

In an embodiment of the present disclosure, the diffraction phase grating array 111 may comprise a plurality of first phase grating groups 111a and second phase grating groups 111b that are periodically arranged, and the first phase grating group 111a and the second phase grating group 111b are symmetrically arranged with respect to a center line of the diffractive lenticular lens 10. Wherein a structural schematic diagram of the diffraction phase grating array 111 corresponding to one period is illustrated in FIG. 3.

Wherein each of the first phase grating group 111a and the second phase grating group 111b comprises first to M-th grating element, that is, the first phase grating group 111a is composed of the first to the M-th grating element, and the second phase grating group 111b is composed of the first to the M-th grating element.

Wherein M is a positive integer.
Wherein each grating element comprises N steps.
Wherein N is 2^m, m is a positive integer.
Wherein for each grating element, a phase difference between adjacent steps is $2\pi/N$, and a height of the step is $$h = \frac{\frac{\lambda}{N}}{n - n_o},$$

wherein $\lambda$ is a wavelength of incident light, n is a refractive index of the first substrate, $n_0$ is a minimum refractive index of the liquid crystal element with respect to the incident polarized light.

In an embodiment of the present disclosure, a j-th grating element comprises a first side and a second side, a distance between the first side and a center line of the diffractive lenticular lens is $r_{j,1}$, and a distance between the second side and the center line of the diffractive lenticular lens is $r_{j,2}$, wherein j is a positive integer less than or equal to M.

Wherein, a first side of each grating element comprises a plurality of steps.

Figure 4:
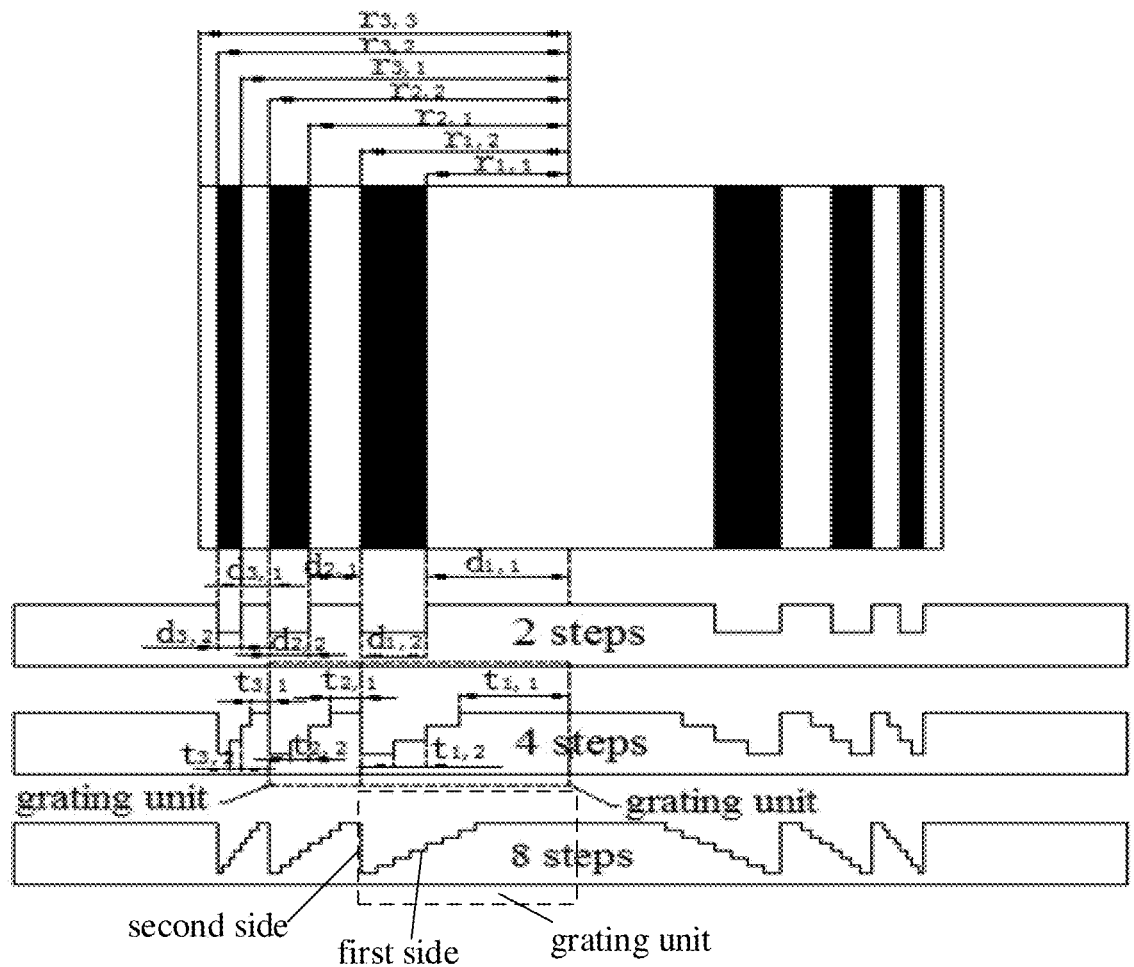
FIG. 4 is a sectional structure schematic diagram of a part of a diffraction phase grating array corresponding to each of the grating elements comprising two steps, four steps and eight steps according to an embodiment of the present disclosure.

For example, supposing that each of the first phase grating group 111a and the second phase grating group 111b comprises three grating elements, FIG. 4 schematically illustrates sectional structure diagram of a part of the diffraction phase grating array 111 corresponding to each of the grating element comprising two steps, four steps and eight steps respectively. It can be seen from FIG. 4 that for the grating element comprising two steps, there are two steps on the first side; for the grating element comprising four steps, there are four steps on the first side; for the grating element comprising eight steps, there are eight steps on the first side.

It should be understood that each grating element in this embodiment comprises N steps so that a groove may be formed in each grating element. The liquid crystal element 12 is filled in the diffraction phase grating array 111 and the liquid crystal molecules in the liquid crystal element 12 may fill the groove of the grating element to improve the image display effect.

Wherein $$r_{j,1} = \left[\left(f + \frac{(2j-1)\frac{\lambda}{2}}{n_1}\right)^2 - f^2\right]^{1/2} = \sqrt{\frac{(2j-1)f\lambda}{n_1}}\left(1 + \frac{(2j-1)\lambda}{4n_1 f}\right)^{1/2}$$

$$r_{j,2} = \left[\left(f + \frac{j\lambda}{n_1}\right)^2 - f^2\right]^{1/2} = \sqrt{\frac{2jf\lambda}{n_1}}\left(1 + \frac{j\lambda}{2n_1 f}\right)^{1/2} \quad (1)$$

wherein f is an object focal length of the lens, and $n_1$ is a refractive index of an object medium where the first substrate is located.

In an embodiment of the present disclosure, widths of consecutive N-1 steps in each grating element are same, and widths of remaining steps are different from the widths of the N-1 steps, wherein the widths of the consecutive N-1 steps in the j-th grating element is $$t_{j,2} = \frac{d_{j,2}}{\frac{N}{2}}, \quad (2)$$

The widths of the remaining steps in the j-th grating element is $$t_{j,1} = d_{j,1} - \sum_{i=1}^{m-1} \frac{d_{j,2}}{2^i},$$

wherein $d_{j,1} = r_{j,1} - r_{j-1,2}$, $d_{j,2} = r_{j,2} - r_{j,1}$. That is, the j-th grating element comprises N-1 steps with the width of $t_{j,2}$ and one step with a width of $t_{j,1}$.

For example, supposing that each of the first phase grating group 111a and the second phase grating group 111b comprises three grating elements, FIG. 4 schematically illustrates a sectional structure diagram of a part of a diffraction phase grating array 111 corresponding to each of the grating elements comprising two steps, four steps and eight steps respectively. It can be seen from FIG. 4 that where each grating element comprises two steps, a width distribution of the steps in the diffraction phase grating array 111 is same as a width distribution of Fresnel wave band. Where each grating element comprises four steps, a width of a step that is different from widths of the other three steps in a first grating element may be determined according to a formula for calculating a step width $$t_{1,1} = d_{1,1} - \frac{d_{1,2}}{2},$$

and a width of each of the remaining three steps is $$t_{1,2} = \frac{d_{1,2}}{2},$$

a width of a step that is different from widths of the other three steps in a second grating element is $$t_{2,1} = d_{2,1} - \frac{d_{2,2}}{2},$$

and a width of each of the remaining three steps is $$t_{2,2} = \frac{d_{2,2}}{2},$$

a width of a step that is different from widths of the other three steps in a third grating element is $$t_{3,1} = d_{3,1} - \frac{d_{3,2}}{2},$$

and a width of each of the remaining three steps is $$t_{3,2} = \frac{d_{3,2}}{2}.$$

Wherein it should be understood that for FIG. 4, where each grating element comprises eight steps, widths of the steps may also be calculated by the formulas (2) and (3), which will not be described here again.

In an embodiment of the present disclosure, the first electrode layer 13 may comprise a plurality of electrode strips.

In an embodiment of the present disclosure, each of the first electrode layer 13 and the second electrode layer 15 may comprise a transparent electrode.

For example, a transparent electrode in the first electrode layer 13 may be a strip-shaped electrode, and a transparent electrode in the second electrode layer 15 may be a plane-shaped electrode.

Figure 5:
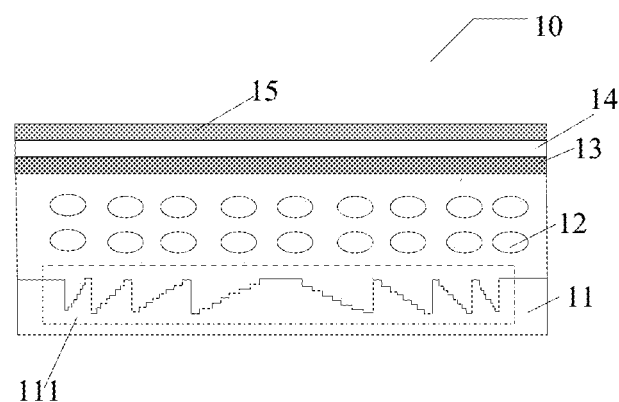
FIG. 5 is a sectional structure schematic diagram of a part of a diffractive lenticular lens where a first electrode layer and a second electrode layer are applied with a voltage according to an embodiment of the present disclosure.

In an embodiment of the present disclosure, if a corresponding display mode acquired by the controller 2 is a 3D display mode, the controller 2 may not apply a voltage to the first electrode layer 13 and the second electrode layer 15, that is, there is no voltage between the first electrode layer 13 and the second electrode layer 15. Where there is no voltage between the first electrode layer 13 and the second electrode layer 15, a refractive index of the liquid crystal element 12 is a low refractive index, that is, the liquid crystal element 12 is in a low refractive index state with respect to incident polarized light. At this time, the lens array 1 plays a role of a diffractive lens array, that is, the lens array is a diffractive lenticular lens array, and at this time, the display switching device enters the 3D display mode.

Where a corresponding display mode acquired by the controller 2 is a 2D display mode, the controller 2 may apply a voltage to the first electrode layer 13 and the second electrode layer 15, that is, a voltage is applied between the first electrode layer 13 and the second electrode layer 15. Where the voltage is applied to the first electrode layer 13 and the second electrode layer 15, the refractive index of the liquid crystal element 12 is a high refractive index, that is, the liquid crystal element 12 is in a high refractive index state with respect to the incident polarized light. At this time, the lens array 1 plays a role of a plate glass, that is, the lens array is a glass to make the display switching device enter the 2D display mode.

Wherein where there is no voltage applied to the first electrode layer 13 and the second electrode layer 15, a deflection state of the liquid crystal of the liquid crystal element in the diffractive lenticular lens is illustrated in FIG. 2.

Wherein where voltages are applied to the first electrode layer 13 and the second electrode layer 15, a partial sectional structure diagram of the diffractive lenticular lens is illustrated in FIG. 5. FIG. 5 schematically illustrates the deflection state of the liquid crystal of the liquid crystal element in the diffractive lenticular lens in this situation.

In the display switching device of the embodiment of the present disclosure, the liquid crystal elements of the lens array are filled in the diffraction phase grating array of the first substrate, a first electrode layer is arranged on the diffraction phase grating array, an insulation layer is arranged on the first electrode layer, a second electrode layer is arranged on the insulation layer, and a corresponding display mode is acquired by the controller, and a control voltage corresponding to the display mode is applied to the first electrode layer and the second electrode layer according to the display mode to change the refractive index state of the liquid crystal element. Therefore, a display switching device with a simple structure is provided, which facilitates the subsequent use to be combined with a display component and realizes 2D and 3D switchable display effects.

In order to implement the above embodiments, the embodiments of the present disclosure also provide a display device.

Figure 6:
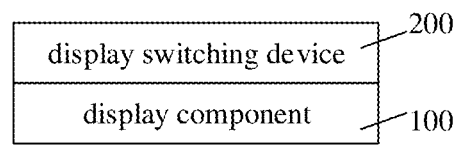
FIG. 6 is a structural schematic diagram of a display device according to an embodiment of the present disclosure.

FIG. 6 is a structural schematic diagram of a display device according to an embodiment of the present disclosure.

As illustrated in FIG. 6, the display device according to an embodiment of the present disclosure comprises a display component 100 and a display switching device 200 that is located on the display component, wherein:

It should be noted that the above description of the display switching device 200 also applies to this embodiment, and details are not described here again.

The display component 100 may be a liquid crystal display (LCD) or an organic light-emitting diode (OLED).

In an embodiment of the present disclosure, supposing that a transmission axis on a light emitting side of the display component is perpendicular to an initial alignment of a long axis of liquid crystal molecules in the liquid crystal element, at this time, in a situation that a voltage is not applied to the first electrode layer and the second electrode layer, the liquid crystal molecules in the liquid crystal element have a low refractive index with respect to incident polarized light, and the lens array functions as a diffractive lenticular lens array and when combined with the display component, the display device can realize a 3D display function.

In addition, where a corresponding control voltage is applied to the first electrode layer and the second electrode layer, the liquid crystal molecules in the liquid crystal element have a high refractive index with respect to the incident polarized light. At this time, the liquid crystal molecules have a high refractive index with respect to the incident polarized light, which is equal to a refractive index of a lower substrate. It is equivalent to fill the diffractive grating on the first substrate. Therefore, the lens array functions as a plate glass and when combined with a display component, the display device can realize a 2D display function.

It should be understood that where the transmission axis of the display component is parallel to an initial alignment of a long axis of the liquid crystal molecules in the liquid crystal element, 3D display can also be realized when the electrode is powered on, and 2D display can be achieved when the electrode is powered off.

Wherein it should be noted that, in some situations, the initial alignment of the liquid crystal element may not be performed, and whether the initial alignment of the liquid crystal element is performed relates to a shape of the liquid crystal element. For example, the liquid crystal element is a blue phase liquid crystal molecular material, and since its molecule initial state is spherical, it is not necessary to perform the initial alignment.

In the display device of the embodiment of the present disclosure, a corresponding display mode is acquired by the controller, and a control voltage corresponding to the display mode is applied to the first electrode layer and the second electrode layer according to the display mode to change the refractive index state of the liquid crystal element. Therefore, a display device with a simple structure and a switchable display mode is provided, which is convenient for a user to perform switching display of 2D and 3D effects based on the display device.

Figure 7:
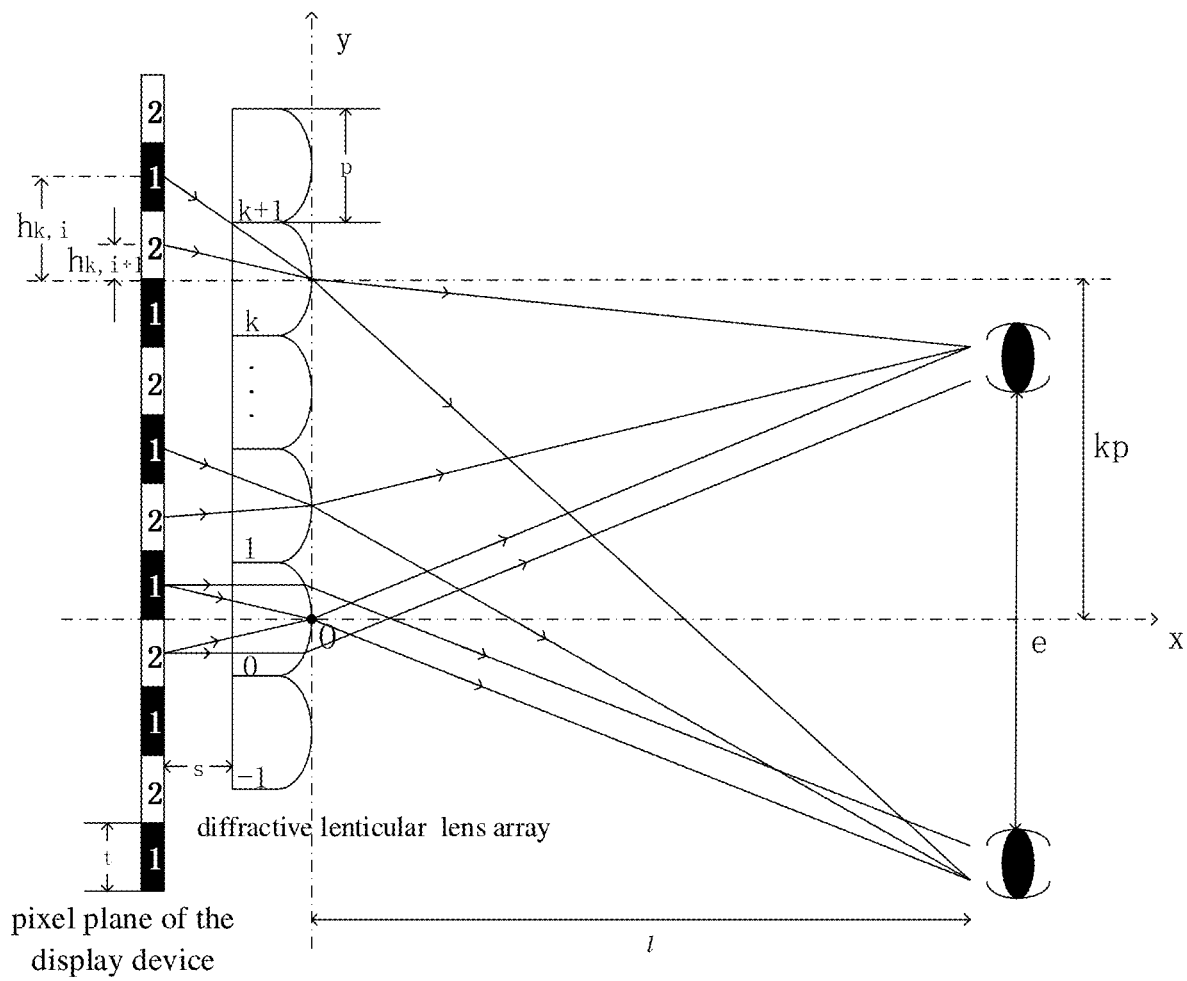
FIG. 7 is a principle structure schematic diagram of a display device according to an embodiment of the present disclosure.

FIG. 7 is a principle structure schematic diagram of a display device according to an embodiment of the present disclosure. Wherein it should be noted that, in order to facilitate description and understanding, in this embodiment, a description will be given by an example in which a diffractive lenticular lens array is drawn into an appearance of a geometrical lenticular lens array.

Wherein a coordinate origin in FIG. 7 is located in a center of a number 0 lens in the diffractive lenticular lens array, an X-axis coincides with an optical axis of the number 0 lens, and a Y-axis is parallel to a pixel plane of the display component. In a positive direction of the Y-axis, numbers of the diffractive lenticular lenses are 1, 2, . . . , k, . . . , and in a negative direction of the Y-axis, numbers of the diffractive lenticular lenses are −1, −2, . . . , −k, . . . , respectively.

Supposing that a user is in a center of a display screen, in this situation, a viewpoint of each parallax image is symmetrically distributed with respect to the X-axis. Where the display device adopts m parallax images, two eyes will receive adjacent two parallax images when the human eyes view the 3D display. A best viewpoint of the i-th parallax image is set to (l,[i−(m+1)/2)]e), wherein i=1,2,3 . . . , m, e is a distance of adjacent viewpoints, and is also a pupil distance of the human eyes.

Wherein it should be noted that FIG. 7 only illustrates a situation of m=2, and coordinates of the two viewpoints are (l, −e/2) and (l, −e/2), respectively.

Supposing that the eyes are located at viewpoints of a i-th and a (i+1)-th parallax images, pixel points that are seen through a k-th diffractive lenticular lens are at heights of $h_{k,i}$ and $h_{k, i+1}$ from the optical axis of the diffractive lenticular lens. According to geometric relations, the follows will be obtained:

$$\frac{h_{k,i}}{f} = \frac{kp - [i - (m+1)/2]e}{l} \quad (4)$$

$$\frac{h_{k,i+1}}{f} = \frac{kp - [(i+1) - (m+1)/2]e}{l} \quad (5)$$

Wherein p is a width of a unit diffractive lens and l is a viewing distance for the human eyes.

According to formulas (4) and (5) we can obtain:

$$h_{k,i} = f \frac{kp - [i - (m+1)/2]e}{l} \quad (6)$$

$$h_{k,i+1} = f \frac{kp - [(i+1) - (m+1)/2]e}{l} \quad (7)$$

Supposing a pixel width of the display component is t, thus:

$$t = h_{k,i} - h_{k,i+1} \quad (8)$$

Combined with formulas (6), (7) and (8), an object focal length of the diffractive lenticular lens can be obtained:

$$f = \frac{tl}{e} \quad (9)$$

In addition, an object point of the i-th parallax image that are seen by the eyes through the k-th lens should fall within a pixel viewing field of the parallax image, that is:

$$mkt + \left(\frac{m}{2} - i\right)t < kp + h_{k,i} < mkt + \left(\frac{m}{2} - i + 1\right)t \quad (10)$$

Bring formulas (6) and (9) to the formula (10), we can obtain:

$$\frac{met}{e+t} - \frac{et}{2k(e+t)} < p < \frac{met}{e+t} + \frac{et}{2k(e+t)} \quad (11)$$

Therefore, a suitable value of p is:

$$p = \frac{met}{e+t} \quad (12)$$

An allowable float range is $$\pm \frac{et}{2k(e+t)}.$$

Wherein at m=2, the width of the unit diffractive lenticular lens can be obtained as $$p = \frac{2et}{e+t}.$$

In order to implement the above embodiments, the embodiments of the present disclosure also provide an electronic device comprising the above display device.

In the electronic device of the embodiments of the present disclosure, a corresponding display mode is acquired by the controller, and the control voltage corresponding to the display mode is applied to the first electrode layer and the second electrode layer according to the display mode to change the refractive index state of the liquid crystal element, and a switchable display of 2D and 3D effect of the electronic device can be achieved.

In order to implement the above embodiments, the embodiments of the present disclosure also provide a lens array, wherein a structural schematic diagram of the lens array 1 is illustrated in FIG. 1, the lens array 1 may comprise a plurality of diffractive lenticular lenses 10.

Wherein each of the diffractive lenticular lenses 10 comprises a same structure. FIG. 2 is a structural schematic diagram of a diffractive lenticular lens 10 according to an embodiment of the present disclosure.

Wherein it should be noted that the above description of the diffractive lenticular lens 10 also applies to the embodiments of the display switching lens array, which will not be described here again.

Figure 8:
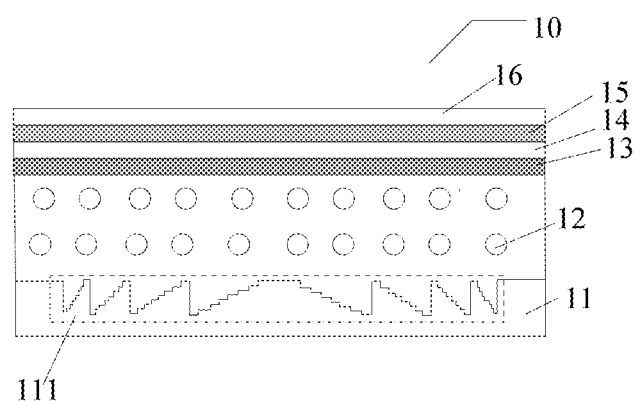
FIG. 8 is a structural schematic diagram of a diffractive lenticular lens according to an embodiment of the present disclosure.

Based on the illustration of FIG. 2, as illustrated in FIG. 8, the diffractive lenticular lens 10 further comprises a second substrate 16 that is located on the second electrode layer 15.

The embodiments of the present disclosure provide a lens array with a simple structure, which facilitates subsequent combination with other devices to achieve the switching of display modes, and realize the switching display of 2D and 3D effects.

In the description of the embodiments of the present disclosure, it should be understood that the terms of orientations or positional relationships "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential" and so on are based on the orientation or positional relationship that are illustrated in the drawings and are merely for convenience of description of the embodiments and simplified description, which do not indicate or imply the devices or components referred to must have a particular orientation or be constructed and operated in a particular orientation, and therefore the terms should not be understood as the limit to the embodiments of the present disclosure.

The present application claims priority to the Chinese patent application No. 201710160630.9, filed Mar. 17, 2017, the entire disclosure of which is incorporated herein by reference as part of the present application.

What is claimed is:

1. A display switching device, comprising:
   a controller; and
   a lens array, comprising a plurality of diffractive lenticular lenses, and each of the plurality of diffractive lenticular lenses comprising:
   a first substrate, wherein the first substrate comprises a diffraction phase grating array;
   a liquid crystal element, comprising liquid crystal that are filled in the diffraction phase grating array;
   a first electrode layer and a second electrode layer, configured to apply a voltage to the liquid crystal element,
   wherein the controller is configured to acquire a corresponding display mode and apply a control voltage corresponding to the display mode to the first electrode layer and the second electrode layer according to the display mode to change a refractive index state of the liquid crystal element,
   wherein each of the first phase grating groups and the second phase grating groups comprises first grating element to M-th grating element,
   the diffraction phase grating array comprises a plurality of first phase grating groups and second phase grating groups that are periodically arranged,
   wherein each grating element comprises N steps, wherein N is $2^m$, m is a positive integer, a phase difference between adjacent steps is $2\pi/N$, and a height of the step is $$h = \frac{\frac{\lambda}{N}}{n - n_o},$$

wherein $\lambda$ is a wavelength of incident light, n is a refractive index of the first substrate, $n_o$ is a minimum refractive index of the liquid crystal element with respect to the incident light,
   a j-th grating element comprises a first side and a second side, wherein a distance between the first side and the center line of the diffractive lenticular lens is $r_{j,1}$, and a distance between the second side and the center line of the diffractive lenticular lens is $r_{j,2}$, wherein j is a positive integer less than or equal to M, $$r_{j,1} = \left[\left(f + \frac{(2j-1)\frac{\lambda}{2}}{n_1}\right)^2 - f^2\right]^{1/2} = \sqrt{\frac{(2j-1)f\lambda}{n_1}}\left(1 + \frac{(2j-1)\lambda}{4n_1 f}\right)^{1/2}$$

$$r_{j,2} = \left[\left(f + \frac{j\lambda}{n_1}\right)^2 - f^2\right]^{1/2} = \sqrt{\frac{2jf\lambda}{n_1}}\left(1 + \frac{j\lambda}{2n_1 f}\right)^{1/2}$$

wherein f is an object focal length of the lens, and $n_1$ is a refractive index of a object medium where the first substrate is located.

2. The display switching device according to claim 1, wherein the first electrode layer is located on the diffraction phase grating array, an insulating layer is arranged between the first electrode layer and the second electrode layer, and the second electrode layer is located on the insulating layer.

3. The display switching device according to claim 1, wherein the first phase grating groups and the second phase grating groups are symmetrically arranged about a center line of the diffractive lenticular lens.

4. The display switching device according to claim 1, wherein a first side of each of the grating elements comprises N steps.

5. The display switching device according to claim 4, wherein widths of consecutive N-1 steps in each grating element are same, and widths of remaining steps are different from the widths of the N-1 steps, wherein the widths of the consecutive N-1 steps in the j-th grating element is $$t_{j,2} \frac{d_{j,2}}{\frac{N}{2}},$$

and the widths of the remaining steps in the j-th grating element is $$t_{j,1} = d_{j,1} - \sum_{i=1}^{m-1} \frac{d_{j,2}}{2^i},$$

wherein $d_{j,1}=r_{j,1}-r_{j-1,2}$, $d_{j,2}=r_{j,2}-r_{j,1}$.

6. The display switching device according to claim 1, wherein the first electrode layer comprises a plurality of electrode strips.

7. The display switching device according to claim 1, wherein each of the first electrode layer and the second electrode layer comprises a transparent electrode.

8. The display switching device according to claim 1, wherein under a condition that the first electrode layer and the second electrode layer are not applied with a voltage, the lens array is the diffractive lenticular lens array to enter a 3D display mode; and under a condition that the first electrode layer and the second electrode layer are applied with a voltage, the lens array is a glass to enter a 2D display mode.

9. A display device, comprising:
a display component;
a display switching device according to claim 1, being on a light emitting side of the display component.

10. An electronic device, comprising the display device according to claim 9.

* * * * *